April 9, 1957

M. A. ENRIGHT 2,788,233

ARC BRAZING AND PINS THEREFOR

Filed April 1, 1953

INVENTOR.
Maurice A. Enright
BY Clyde H. Haynes
his atty.

United States Patent Office 2,788,233
Patented Apr. 9, 1957

2,788,233

ARC BRAZING AND PINS THEREFOR

Maurice A. Enright, Lorain, Ohio, assignor to Gregory Industries, Inc., Detroit, Mich., a corporation of Michigan Application April 1, 1953, Serial No. 346,153

4 Claims. (Cl. 287—20.2)

The invention relates in general to arc brazing pins and the method of cleaning the pin and a work piece to which the pin is to be attached by brazing.

One of the objects of the invention is to provide the method of arc brazing pins to a work piece, wherein an arc is drawn between brazing material on the pin and the work piece to cause a flux to simultaneously clean both the pin and the work piece.

Another object of the invention is to provide a brazing pin which is easily and economically made in mass production with the brazing material carrying flux for cleaning the surface of the pin and the adjacent surface of work to which the pin is brazed simultaneously.

Another object of the invention is to provide a brazing pin consisting of a pin body having a metal portion carrying arc brazing material and flux.

Other objects of the invention will become apparent from the following description and claims taken in conjunction with the drawing in which:

In the present invention neither the pin nor the surface of the work to which the pin is to be brazed are cleaned by brazing flux prior to the final brazing operation in which the pin is attached to the work. In the past pins and other members have been made with a brazing material secured thereto by fusing the brazing material to the surface of the pin. The surface of the pin was cleaned with the brazing flux at this time. Later when the pin was brazed to a plate or work, a second fluxing was necessary to clean the surface of the work so that the brazing material fused thereto, to hold the pin on the work. This double fusing and double fluxing coupled with the separate cleaning of the different surfaces at different times is unnecessary. In the present invention both surfaces are cleaned simultaneously with a single fluxing and a brazing material is fused to both surfaces at this time.

The arc brazing pins illustrated in Figures 1–6 consists of a pin body 10 having a piece of brazing material 11 fixed thereto. Associated with the arc brazing material 11 is a flux 12. The pin body 10 may be of a desired size or shape with a square, triangular, rectangular, circular or other cross section. The pin body 10 may also be of any material having a metallic portion engaged by the piece of brazing material. This metallic portion consists of steel or other ferrous or nonferrous alloys. The brazing material used in the piece 11 is any suitable material having a melting temperature less than the melting temperature of the pin body 10. The specific brazing material used, entirely depends on the specific metals being brazed. In actual practice a silver solder having melting temperature in the range of 1100 to 1300° F. may be used on both ferrous and nonferrous pin bodies. The flux is preferably in powder form but may be in the form of a solid, paste or semifluid if desired.

Figure 1:
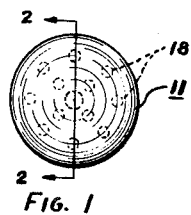
Figure 1 is an end view of an arc brazing pin.
Figure 2:
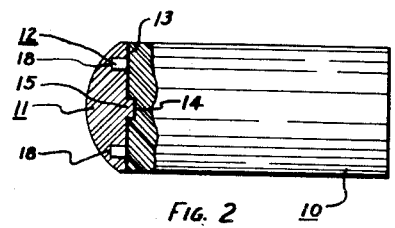
Figure 2 is a sectional view taken along the line 2—2 of the pin illustrated in Figure 1.

A more detailed description of the arc brazing pin, Figures 1 and 2, is as follows: The pin body 10 has a surface 13 which is to be brazed to the work. The surface 13 is on a metallic portion of the pin body 10 and has a recess 14 therein. It has been found that best results are obtained if this recess 14 is in the form of a small hole drilled, punched or otherwise formed in the center of the surface 13. It is understood, however, that more than one recess 14 may be used if necessary and that these recesses may be positioned other than at the center of the end surface. The piece of brazing material 11 is mechanically attached to cover the surface 13 by deforming a leg portion 15 thereof into the recess 14. If desired the recess 14 and the leg portion 15 of the piece 11 may have complementary threads or other means which will mechanically hold the piece 11 on the surface 13 as well as the above mentioned deforming of the piece 11.

In Figures 1 and 2 the piece 11 is illustrated as having recesses 18 on the under surface thereof, and opening against the surface 13 of the pin body 10. The recesses 18 contain the flux 13. It is preferable to have the recesses 18 extend as far as is practically possible through the thickness of the piece of brazing material 11. Generally, the flux 12 extends more than half way through the thickness of the piece 11. These flux receiving recesses 18 may be positioned in any desired pattern relative to the shape of the pin body and the piece of brazing material.

Figure 3:
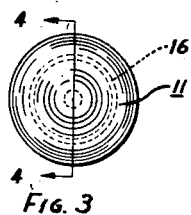
Figure 3 is an end view of a modification of the pin illustrated in Figure 1.
Figure 4:
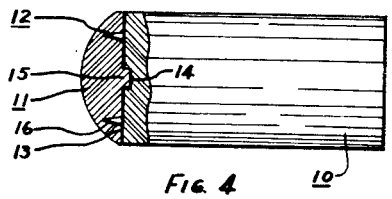
Figure 4 is a sectional view taken along the line 4—4 of Figure 3.

In Figures 3 and 4 a modification of the pin illustrated in Figure 1 shows that it is possible to use a single flux receiving recess or annular groove 16 in place of the flux receiving recesses 18 of Figure 2.

Figure 5:
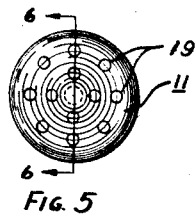
Figure 5 is an end view of another modification of the arc brazing pin.
Figure 6:
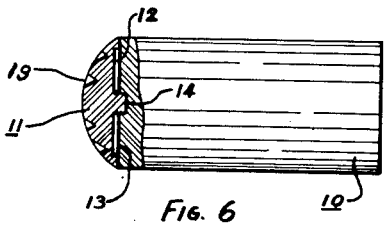
Figure 6 is a sectional view taken along the line 6—6 of Figure 5.

In Figure 5 a layer of flux 12 is spread out over the surface 13 and between the piece of brazing material 11 of the pin body 10. The peripheral edge of the brazing material 11 seats against the end surface 13 thus forming a recess in the brazing material 11 to hold the layer of flux 12. In this instance the piece of brazing material 11 also has at least a recess 19 on the outer surface thereof, for holding more flux. The recess or recesses 19 may also be used on the outer surface of the piece of brazing material 11 in Figures 1 to 4 inclusive, if so desired.

Figure 7:
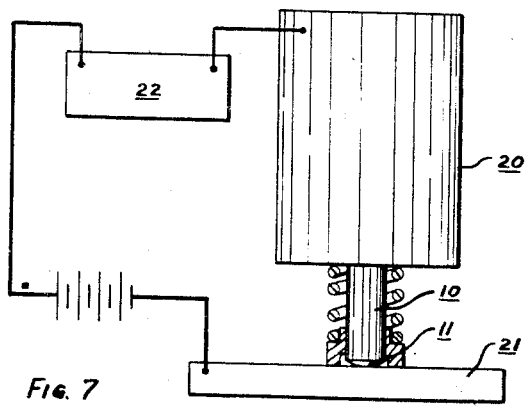
Figure 7 is a schematic diagram of the arc brazing equipment used in brazing the pins of Figures 1 to 5 inclusive by drawing an arc between the brazing material on the pin and the work to cause flux to simultaneously clean both the end of the pin and the adjacent surface of the work.

When the brazing pin is inserted in holder 20, illustrated diagrammatically in Figure 7, and the holder is positioned relative to the work 21, an arc may be initiated between the end of the brazing pin 10 and the work. The electrical circuit for brazing consists of a source of current, a control 22 for controlling the current, the brazing pin holder 20 and the work 21 connected in series. The control 22 controls the duration of the arc established between the piece of brazing material 11 on pin 10 and the work 21. The holder, control, and power source may be the same as or similar to those normally used in end arc fastenings.

This type of equipment was used to carry out the method of cleaning the surface of both the pin and the work simultaneously by means of an arc drawn between the piece of brazing material 11 and the work 21. When an arc is drawn between the brazing material 11 and the work, the outer surface of the brazing material 11 melts, allowing flux 12 to clean both the surface 13 of the pin body 10 and the opposing or adjacent surface of the work 21 simultaneously. The arc is then sustained for a predetermined duration until the flux has cleaned these opposing surfaces and the piece of brazing material 11 is completely melted. Next the arc is extinguished and the pin body 10 moved towards the work 11 to allow the molten brazing material to fuse to the cleaned surfaces of the pin body and work.

The foregoing description and attached drawings are intended to exemplify the preferred embodiment of the invention and are not intended to limit the spirit and scope of the invention as is defined in the following claims.

What is claimed is:

1. A brazing pin comprising a pin body having an end to be brazed to work, a piece of brazing material having a melting temperature less than the melting temperature of the pin body affixed to the end of said body, said piece having a recess closed by said end and containing brazing flux for fluxing the end of said pin, said piece also having at least a recess on the outside surface containing flux for fluxing the work to which the pin is to be brazed.

2. The structure as defined in claim 1, wherein said body has a recess in the end thereof, and said piece has a leg extending into said recess to hold the piece on the body.

3. A brazing pin comprising a pin body having an end to be brazed to work, a piece of brazing material having a melting temperature less than the melting temperature of the pin body affixed to the end of said body, said piece having a recess closed by said end and containing brazing flux for fluxing the end of said pin, said body having a recess in the end thereof, and said piece having a leg extending into said recess in said body to hold the piece on the body.

4. The method of brazing a pin to work comprising the steps of providing a brazing material having a lower melting temperature than the pin or the work with flux, upsetting the brazing material by pressure and forcing part of it into a recess in the pin, simultaneously melting the brazing material and cleaning the opposing surfaces of both the pin and work by establishing an arc between the brazing material and the work and finally moving the pin towards the work and allowing some of the brazing material to solidify on the pin and the work to form a brazed joint.

References Cited in the file of this patent

UNITED STATES PATENTS

| | | |
|---|---|---|
| Re. 22,411 | Nelson | Dec. 21, 1943 |
| 2,402,659 | Nelson | June 25, 1946 |
| 2,506,747 | Smith | May 9, 1950 |
| 2,584,491 | Nelson | Feb. 5, 1952 |
| 2,711,798 | Aversten | June 28, 1955 |